United States Patent [19]
Hoover et al.

[11] Patent Number: 5,710,751
[45] Date of Patent: Jan. 20, 1998

[54] POLYGON FACET ERROR EFFECTS ELIMINATION IN MULTI-PASS COLOR SYSTEMS

[75] Inventors: Martin E. Hoover; Orlando J. Lacayo, both of Rochester; Roy W. Rivers, Geneseo, all of N.Y.

[73] Assignee: Xerox Corporation, Stamford, Conn.

[21] Appl. No.: 510,998

[22] Filed: Aug. 3, 1995

[51] Int. Cl.⁶ .................................................. G11B 7/00
[52] U.S. Cl. .................................................. 369/97; 369/125
[58] Field of Search .............................. 369/97, 54, 58, 369/47, 125; 360/77.05, 77.01

[56] References Cited

U.S. PATENT DOCUMENTS

| | | | |
|---|---|---|---|
| 5,208,796 | 5/1993 | Wong et al. | 369/97 |
| 5,237,521 | 8/1993 | Raj et al. | 364/561 |
| 5,268,891 | 12/1993 | Yanagidate | 369/97 |
| 5,548,114 | 8/1996 | Van Rosmalen et al. | 369/97 X |

Primary Examiner—Muhammad N. Edun
Attorney, Agent, or Firm—Ronald F. Chapuran

[57] ABSTRACT

An imaging system for forming multiple superimposed image exposure frames on a photoconductive member moving in a process direction including a rotating polygon having a plurality of facets. A raster output scanner forms a plurality of scanlines in a transverse direction across the photoconductive member by reflecting modulated beams from the rotating polygon. A control provides a start of scan (SOS) signal for each of the facets of the rotating polygon, determines the facet related to the first scanline of a first image exposure frame on the photoconductive member, and initiates the first scanline of each succeeding superimposed image exposure frame on the photoconductive member in relation to the facet related to the first scanline of the first image exposure frame. Similarly, a time period measurement between a given facet occurrence to the same given facet repeat occurrence, relative to subsequent full revolutions of the polygon, provides an 'error free' electronic representation of the speed of the polygon.

9 Claims, 3 Drawing Sheets

POLYGON FACET ERROR EFFECTS ELIMINATION IN MULTI-PASS COLOR SYSTEMS

BACKGROUND AND MATERIAL DISCLOSURE STATEMENT

This invention relates generally to a raster output scanning system for producing a high intensity imaging beam which scans across a rotating polygon to a movable photoconductive member to record electrostatic latent images thereon, and, more particularly, to the elimination of the effects of rotating polygon facet to facet geometric errors.

In recent years, laser printers have been increasingly utilized to produce output copies from input video data representing original image information. The printer typically uses a Raster Output Scanner (ROS) to expose the charged portions of the photoconductive member to record an electrostatic latent image thereon. Generally, a ROS has a laser for generating a collimated beam of monochromatic radiation. The laser beam is modulated in conformance with the image information. The modulated beam is reflected through a lens onto a scanning element, typically a rotating polygon having mirrored facets.

The light beam is reflected from a facet and thereafter focused to a "spot" on the photosensitive member. The rotation of the polygon causes the spot to scan across the photoconductive member in a fast scan (i.e., line scan) direction. Meanwhile, the photoconductive member is advanced relatively more slowly than the rate of the fast scan in a slow scan (process) direction which is orthogonal to the fast scan direction, In this way, the beam scans the recording medium in a raster scanning pattern. The light beam is intensity-modulated in accordance with an input image serial data stream at a rate such that individual picture elements ("pixels") of the image represented by the data stream are exposed on the photosensitive medium to form a latent image, which is then transferred to an appropriate image receiving medium such as paper. Laser printers may operate in either a single pass or multiple pass system.

In a multiple pass system, each image area on the photoreceptor surface must make at least three revolutions (passes) relative to the transverse scanline formed by the modulated laser beam generated by a ROS system. Each image must be registered to within a 0.1 mm circle or within a tolerance of ±0.05 mm. Each color image must be registered in both the photoreceptor process direction (skew registration) and in the direction perpendicular to the process direction (referred to as fast scan or transverse registration).

Various techniques for multiple image registration are known in the prior art. For example, U.S. Pat. No. 5,208,796 discloses a technique wherein targets on a photoconductor belt are used for the detection of lateral belt displacement to control the transverse location of exposure scan. In addition, U.S. Pat. No. 5,381,165 discloses the registration of color images in the process direction in a raster output scanner.

A difficulty, however, in the prior art is that polygon facets are not geometrically perfect. Because polygon facets are not geometrically perfect, one of the resulting errors is scan length variation from any given facet to any other facet. In image on image systems, particularly color, scan length variation between first and subsequent scanlines is manifested in color misregistration.

Thus, it would be desirable to provide a multi-pass color polygon scanning system that reduces or eliminates the effects of polygon facet to facet geometric errors in the scan direction. It is therefore an object of the present invention to eliminate scan length color registration error in every color on color line. Another object is to improve overall output copy color registration error in systems where polygon speed control is derived from a source such as a start of scan (start of facet) sensor using polygon facets for feedback information on polygon speed. Other advantages of the present invention will become apparent as the following description proceeds, and the features characterizing the invention will be pointed out with particularity in the claims annexed to and forming a part of this specification.

SUMMARY OF THE INVENTION

There is disclosed an imaging system for forming multiple superimposed image exposure frames on a photoconductive member moving in a process direction including a rotating polygon having a plurality of facets, a raster output scanner forming a plurality of scanlines in a transverse direction across the photoconductive member by reflecting modulated beams from the rotating polygon, and a control. The control provides a start of scan (SOS) signal for each of the facets of the rotating polygon, determines the facet related to the first scanline of a first image exposure frame on the photoconductive member, and initiates the first scanline of each succeeding superimposed image exposure frame on the photoconductive member in relation to the facet related to the first scanline of the first image exposure frame. Similarly, a time period measurement between a given facet occurrence to the same given facet repeat occurrence, relative to subsequent full revolutions of the polygon, provides an 'error free' electronic representation of the speed of the polygon, For a better understanding of the present invention, reference may be had to the accompanying drawings wherein the same reference numerals have been applied to like parts and wherein:

DESCRIPTION OF THE INVENTION

Figure 1:
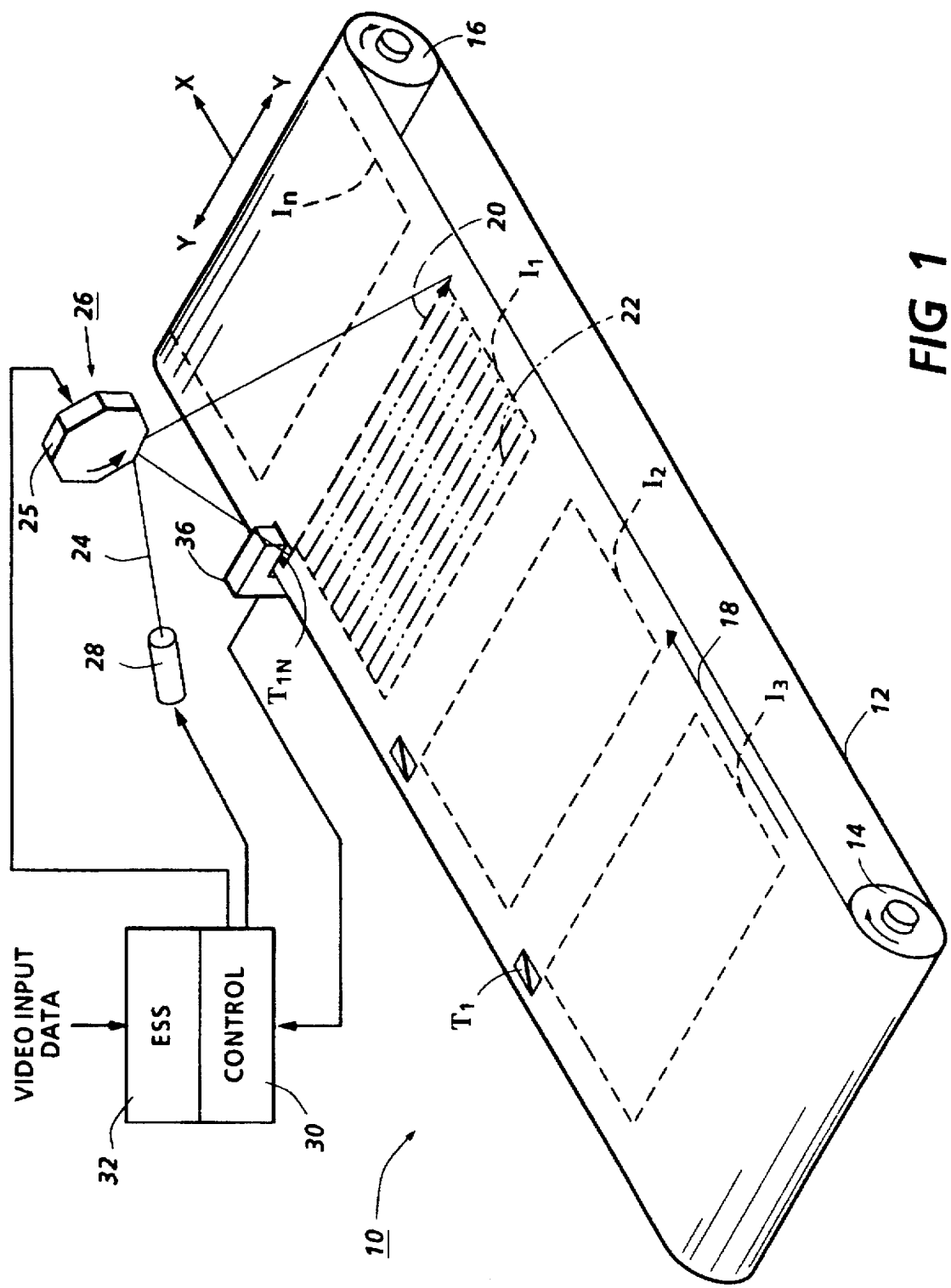
FIG. 1 shows a multi-pass ROS color printing system.

In FIG. 1 of the drawings, an embodiment of the present invention is incorporated in a multi-pass xerographic printing system depicted schematically and designated generally by reference numeral 10. The system 10 includes a photoreceptive belt entrained about guide rollers 14 and 16, at least one of which is driven to advance the belt 12 in a longitudinal direction of processing travel depicted by the arrow 18. The length of the belt 12 is designed to accept an integral number of spaced image areas $l_1$–$l_n$ represented by dashed line rectangles in FIG. 1. As each of the image areas $l_1$–$l_n$ reaches a transverse line of scan, represented by a dashed arrow 20, it is progressively exposed on closely spaced transverse raster lines 22 shown with exaggerated longitudinal spacing on the image area $l_1$ in FIG. 1.

In the embodiment depicted in FIG. 1, the line 20 is scanned by a raster output scanner so that a modulated laser beam 24 is reflected to the line 20 by successive facets 25 on a rotatable polygon-shaped mirror 26. The beam 24 is emitted by a laser device 28 such as a laser diode, operated by a laser drive module forming part of a control processor generally designated by the reference numeral 30. The processor 30 includes other not shown circuit or logic modules such as a scanner drive command circuit, by which operation of a motor (not shown) for rotating the polygon mirror 26 is controlled.

In the operation of the system 10, as thus far described, the control 30 responds to a video signal to expose each raster line 22 to a linear segment of the video signal image. In xerographic color systems, each image area $l_1$–$l_n$, must be exposed in the same manner to four successive exposures, one for each of the three basic colors and black. In a multi-pass system such as the system 10, where only one raster output scanner or head is used, complete exposure of each image area requires four revolutions of the belt 12.

The image areas $l_1$–$l_n$ are successively exposed on successive raster lines 22 as each raster line registers with a transverse scanline 20 as a result of longitudinal movement of the belt 12.

It is to be noted that the length of the transverse scanline 20 in system 10 is longer than the transverse dimension of the image areas l. Scanline length, in this respect, is determined by the length of each mirror facet 25 and exceeds the length of the raster lines 22. The length of each raster line is determined by the time during which the laser diode is active to reflect a modulated beam from each facet 25 on the rotating polygon 26 as determined by the laser drive module. Thus, the active portion of each transverse scanline may be shifted in a transverse direction by control of the laser drive module and the transverse position of the exposed raster lines 22, and image areas $l_1$–$l_n$, shifted in relation to the belt 12.

Adjustment of the active portion of the transverse scanline 20 for each succeeding image is needed to assure precise longitudinal alignment or transverse registration of the succeeding images with the first image irrespective of the lateral position of the belt during exposure of the images. This operation is achieved in substantial measure by the provision of targets aligned in the direction of belt travel and of a design to facilitate generation of a signal corresponding to the location of each target. In particular and in the multi-pass system of FIG. 1, targets $T_1$–$T_n$ are located along a marginal edge of the belt 12 to be aligned in a longitudinal direction and are spaced to be located slightly ahead of each image areas $l_1$–$l_n$, or upstream from each such area in the context of belt travel. A single sensor 36 is located to be aligned with targets T1–Tn for the image area passing the transverse scanline 20 in FIG. 1.

Downstream from the exposure station, a development station (not shown) develops the latent image formed in the preceding image area. After the last color exposure, a fully developed color image is then transferred to an output sheet. An electronic Sub System (ESS) 32 contains the circuit and logic modules which respond to input video data signals and other control and timing signals, to drive the photoreceptor belt 17 synchronously with the image exposure and to control the rotation of the polygon by the motor. For further details, reference is made to U.S. Pat. Nos. 5,381,165 and 5,208,796 incorporated herein.

As illustrated any suitable marker on the photoconductive surface or belt or any suitable hole provides a reference for each projected image on the belt surface. In other words, the detection by sensor of a mark or hole in the photoconductive surface establishes the first scanline of the projected image and in a multi pass image on image system, helps to establish image on image registration. In addition, the start of scan signals indicate the scanning laser beam to be at a start of scan position with reference to the photoconductive surface.

Generally, in the prior art, with a polygon of eight facets, the detected start of scan signal for each of eight facets on a polygon are used to inject a phase shift into the polygon motor. In particular, a polygon controller monitors the SOS signals from each of the facets, as the polygon rotates, to either speed up or slow down the rotating polygon to maintain uniform rotation. Thus there is a closed loop control from the SOS detector to maintain a uniform speed of rotation of the polygon. It is well known that the individual facets to a polygon, because of fabrication tolerances, are not all similar. The facets are different in degree of flatness or off center, and there is a non uniformity of the scanning beam reflected on to the photoconductive belt due to this non uniformity.

In accordance with the present invention, for better accuracy and better motion quality and to overcome the inaccuracy of facet errors, the rephasing and speed control of the rotating polygon is phased or referenced to one selected facet of the rotating polygon.

Figure 2A:
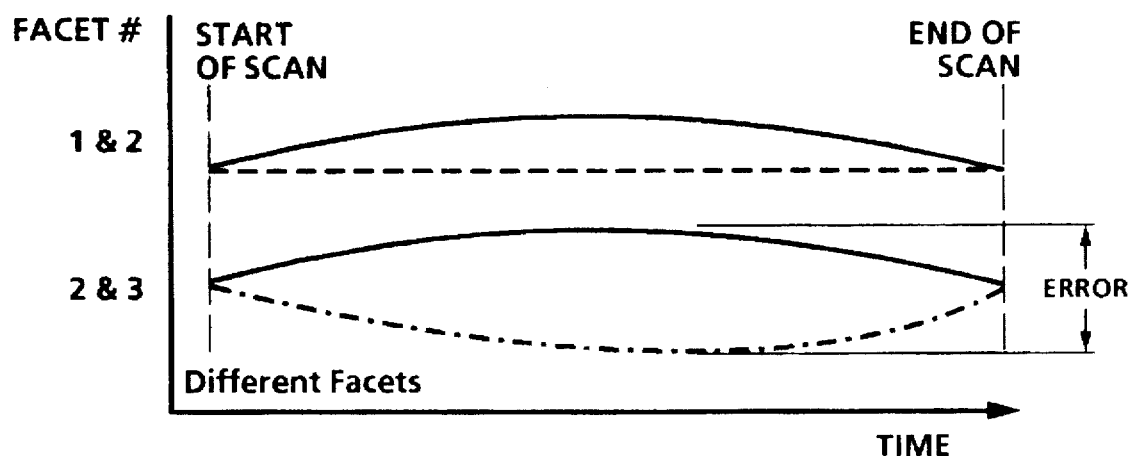
FIGS. 2A and 2B illustrates facet error elimination.

With reference to FIG. 2A, there is illustrated the misregistration that occurs in the prior art due to the fact that polygon facets are not geometrically precise. Thus, there is a resulting error or misregistration from scan length variation from any given facet to any other facet. In particular, in image on image systems, scan length variation between first and subsequent scanlines results in color misregistration. As shown in FIG. 2A, the lead edge of a first color separation begins with facet number 1 (straight, dashed line) and the lead edge of a second color separation begins with facet number 2 (solid, curved line). The second scanline of the first color separation is facet number 2, (solid, curved line) and the second scanline of the second color separation is facet number 3, (dashed, curved line).

Figure 2B:
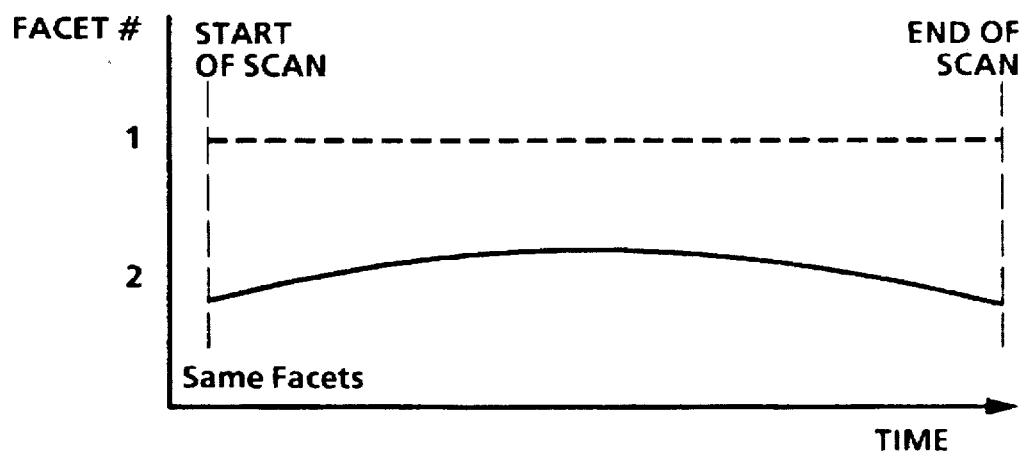

Thus, there is a misregistration error shown by the arrow when using different facets to start different color separations. On the other hand, FIG. 2B, illustrates facet elimination by using the same facet to start each color separation. In other words, with reference to facet number 1, the lead edge of each color separation begins with this facet. Misregistration errors due to facet tolerances are therefore eliminated. It should be understood that in FIG. 2B, the selection of a given facet such as either facet number 1 or facet number 2 is arbitrary, but once selected, the same facet is used to begin each color separation. For example, if facet number 2 is the selected facet, the images are superimposed on each other since the same facet is used to start the image for each color separation. The same facet is used for the rephasing as well as for speed control of the polygon.

The use of the same facet for each revolution of the polygon is particularly applicable to a multi-pass image on image system to both reduce or eliminate error in a scanline as well as to eliminate start of scan spot signal differences for each facet. This, of course, assumes that a start of scan signal for a selected facet is the controlling signal throughout the scanning operation. Any arbitrary facet can be selected but once selected, the same facet is used for the rephasing and the same facet is used for speed control of the polygon.

It should be noted that there are various methods of identifying and tracking a selected facet of the rotating polygon for each rotation of the polygon in accordance with the present invention. For example, an index timing pulse at the start of scan signal for the first projected image can be recorded and a timing period or counting method used to determined the passage or reflection of the beam from eight facets for a complete revolution and a beginning scan again for the selected facet. In this manner, the system is being rephased to the same facet for each rotation of the polygon and for the start of scan or beginning scan cycle of each succeeding image in an image on image system. This eliminates the tolerance error of the polygon facets. In addition, by using the feedback from the SOS signal of the same facet of the polygon, there is more consistent feedback speed data accuracy and thus better motion quality. This leads to better speed control and a more steady state speed of the polygon.

Figure 3:
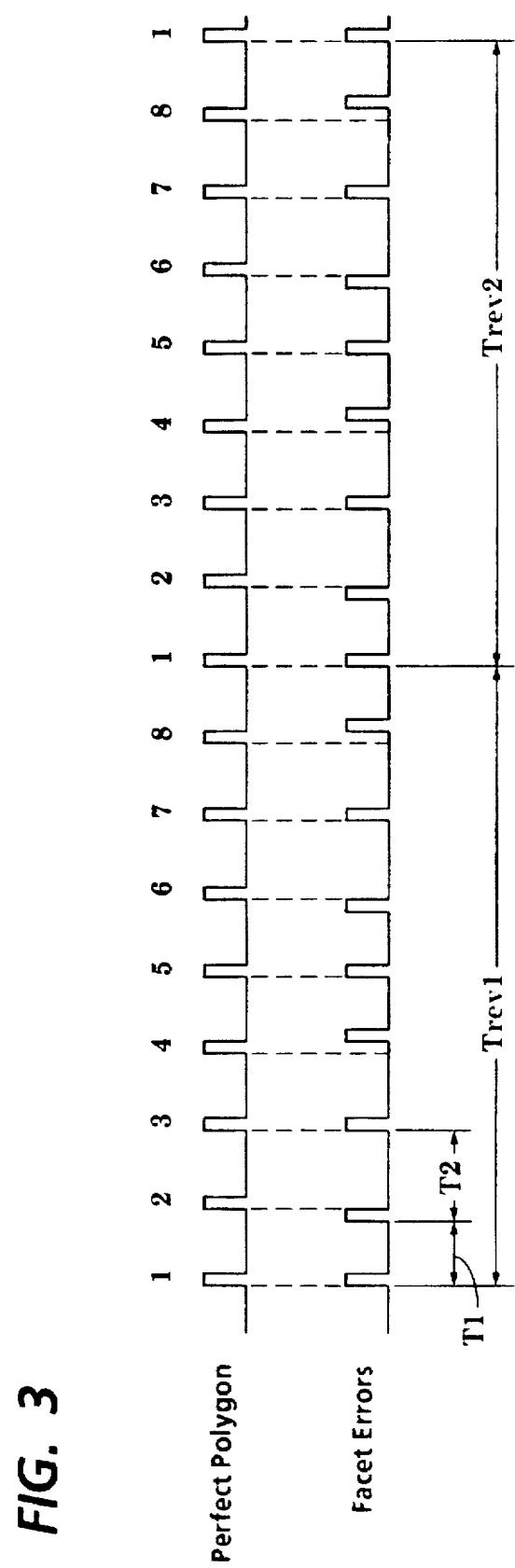
FIG. 3 illustrates the start of scan (SOS) signals and related speed control improvement.

With reference to FIG. 3, there is an illustration of the elimination of facet errors when using a start of scan (SOS) pulse train as a motion encoder for speed control. Assuming a polygon is rotating at constant speed and the polygon has identical facets, the pulse train will be a uniform constant frequency with symmetrical periods between SOS pulses. However, if the polygon has facet errors, then the pulse train will have slightly different time periods between SOS pulses, although the time period will be a symmetrical same period for each particular same facet SOS pulse. The period difference for different facets caused inaccuracy when used as feedback for a motor polygon assembly speed control. However, in accordance with the present invention, the pulse train is divided down once per polygon revolution and the period of SOS pulses is measured from the same facet. This eliminates inaccuracy from the period measurements used as feedback and allows better accuracy feedback measurement for speed control when using an SOS pulse train as a motion encoder feedback signal.

In particular, in accordance with a preferred embodiment at the start of scan of the first image to be projected in a multi pass system, a time stamp is triggered that is stored in a register. The particular facet of the eight facets of the rotating polygon that is being scanned at the start of scan location is then the particular facet to be tracked for subsequent SOS readings. That time stamp forms the bases of the time stamps for subsequent revolutions of the polygon and the difference in time stamps provides an error signal used as feedback to control the speed of the rotating polygon.

In particular, a time period measurement between a given facet occurrence (SOS n) to the same given facet repeat occurrence (SOS n), relative to subsequent full revolutions of the polygon, provides an 'error free' electronic representation of the speed of the polygon. The accuracy of this information allows the speed to be more precisely controlled by virtue of having an error free speed representation, thereby not erroneously gyrating the polygon motor speed to the smallest of magnitudes. The more precisely controlled speed results in line end of line position consistency, as shown in FIG. 3. The combined result is 'color registration improvements', in two directions, yielding true color on color alignment. Speed control is implemented by a period regulator method that provides adequate motion quality yet at the same time directly extends to the phase shifting function involved with polygon rephasing.

While the invention has been described with reference to the structure disclosed, it will be appreciated that numerous changes and modifications are likely to occur to those skilled in the art, and it is intended to cover all changes and modifications which fall within the true spirit and scope of the invention.

What is claimed is:

1. An imaging system for forming multiple superimposed image exposure frames on a photoconductive member moving in a process direction including:
   a raster output scanner forming a plurality of scanlines in a transverse direction across the width of said member by reflecting modulated beams from a plurality of facets of a rotating polygon,
   means for detecting the beginning of a scanline and providing a start of scan (SOS) signal representing the detection,
   means to detect a first SOS signal for a first scanline of a first image exposure frame on the photoconductive member,
   means to relate the SOS signal for a first scanline of a first image exposure frame to a given facet of the rotating polygon, and
   means to detect a second SOS signal for a first scanline of a second image exposure frame superimposed on the first image exposure frame on the photoconductive member, the second SOS signal being related to said given facet of the rotating polygon in order to minimize color registration error.

2. The system of claim 1 wherein the given facet is an arbitrarily selected facet.

3. The system of claim 2 including means to initiate the scanning of a first scanline of subsequent superimposed image exposure frames in reference to said arbitrarily selected facet.

4. An imaging system for forming multiple superimposed image exposure frames on a photoconductive member moving in a process direction including:
   a raster output scanner forming a plurality of scanlines in a transverse direction across the width of said member by reflecting modulated beams from a plurality of facets of a rotating polygon,
   means for detecting the beginning of a scanline and providing a start of scan (SOS) signal representing the detection,
   means to detect SOS signals for a first scanline of each of the multiple superimposed image exposure frames on the photoconductive member, and
   means to synchronize each of the SOS signals for the first scanline of each of the multiple superimposed image exposure frames to the same facet of the plurality of facets of the rotating polygon whereby color to color registration error is decreased.

5. An imaging system for forming multiple superimposed image exposure frames on a photoconductive member moving in a process direction comprising:
   a rotating polygon having a plurality of facets,
   a raster output scanner forming a plurality of scanlines in a transverse direction across the width of said member by reflecting modulated beams from the rotating polygon, and
   a control including
   means for detecting the beginning of a scanline and providing a start of scan (SOS) signal representing the detection for each of the facets of the rotating polygon,
   means for determining the facet related to the first scanline of a first image exposure frame on the photoconductive member, and
   means for initiating the first scanline of each succeeding superimposed image exposure frame on the photoconductive member in relation to said facet related to the first scanline of the first image exposure frame.

6. An imaging system for forming multiple superimposed image exposure frames on a photoconductive member moving in a process direction including a rotating polygon having a plurality of facets, a raster output scanner forming a plurality of scanlines in a transverse direction across the photoconductive member by reflecting modulated beams from the rotating polygon; and a control providing a start of scan (SOS) signal for each of the facets of the rotating polygon, determining the facet related to the first scanline of a first image exposure frame on the photoconductive member, and initiating the first scanline of each succeeding superimposed image exposure frame on the photoconductive member in relation to the facet related to the first scanline of the first image exposure frame.

7. An imaging system for forming multiple superimposed image exposure frames on a photoconductive member moving in a process direction including:

a raster output scanner forming a plurality of scanlines in a transverse direction across the width of said member by reflecting modulated beams from a plurality of facets of a rotating polygon, means for detecting the beginning of a scanline and providing a start of scan (SOS) signal representing the detection, means to detect a first SOS signal for a first scanline of a first image exposure frame on the photoconductive member, means to relate the SOS signal for a first scanline of a first image exposure frame to a given arbitrarily selected facet of the rotating polygon, means to detect a second SOS signal for a first scanline of a second image exposure frame superimposed on the first image exposure frame on the photoconductive member, the second SOS signal being related to said given arbitrarily selected facet of the rotating polygon in order to minimize color registration error, and means to initiate the scanning of a first scanline of subsequent superimposed image exposure frames in reference to said arbitrarily selected facet.

8. An imaging system for forming image exposure frames on a photoconductive member moving in a process direction including:

a scanner forming a plurality of scanlines across said member by reflecting modulated beams from a plurality of facets of a rotating polygon, means for detecting the beginning of a scanline and providing a start of scan (SOS) signal representing the detection, means to detect SOS signals for a first scanline of each of the image exposure frames on the photoconductive member, and means to synchronize each of the SOS signals for the first scanline of each of the image exposure frames to the same facet of the plurality of facets of the rotating polygon whereby color to color registration error is decreased.

9. The method of claim 8 wherein the same facet is an arbitrarily selected facet.

\* \* \* \* \*